Dec. 11, 1928. 1,694,984
H. K. SCHRAGE
SPEED CONTROL OF INDUCTION MOTORS
Original Filed April 8, 1925   2 Sheets-Sheet 2

Inventor:
Hidde K. Schrage,
by Alexander S. ____
His Attorney.

Patented Dec. 11, 1928.

1,694,984

UNITED STATES PATENT OFFICE.

HIDDE K. SCHRAGE, OF PARIS, FRANCE, ASSIGNOR TO GENERAL ELECTRIC COMPANY, A CORPORATION OF NEW YORK.

SPEED CONTROL OF INDUCTION MOTORS.

Application filed April 8, 1925, Serial No. 21,662, and in France June 20, 1924. Renewed August 14, 1928.

My invention relates to systems wherein the speed of an induction motor is controlled by variation in the magnitude of a regulating voltage applied to its secondary circuit either through a regulating winding forming a part of the motor, or through a regulating machine interconnected with the motor, and has for its object the provision of an improved arrangement for controlling the commutation of the regulating machine or winding in a manner to render possible the utilization of regulating voltages higher than those heretofore used for this purpose.

It is well known that the speed of an induction motor can be regulated by means of a variable voltage applied to its secondary circuit, and that the limit to which the regulating voltage can be increased is dependent on the commutation characteristics of the regulating winding or machine through which this voltage is applied to the secondary circuit of the motor. If the motor be supplied with current at a frequency of 60 cycles, for example, difficulty is encountered, when the voltage at the commutator of the regulating winding or machine exceeds 45 or 50 volts, due to the large commutator and great number of commutator brushes required to transmit the large regulating currents required at these voltages. In accordance with my invention, provision is made for suppressing the field flux in the commutation zone of the regulating winding or machine.

My invention will be better understood from the following description when considered in connection with the accompanying drawing and its scope will be pointed out in the appended claims.

Figure 1:
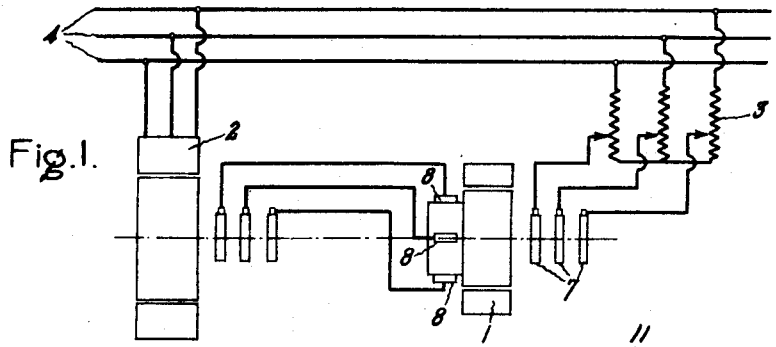
Figure 2:
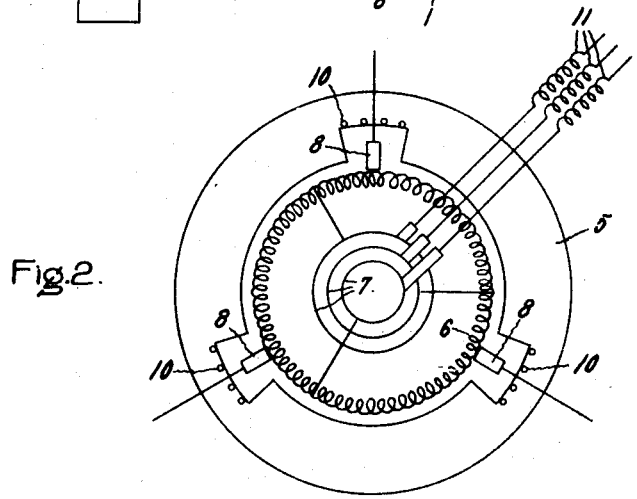
Figure 3:
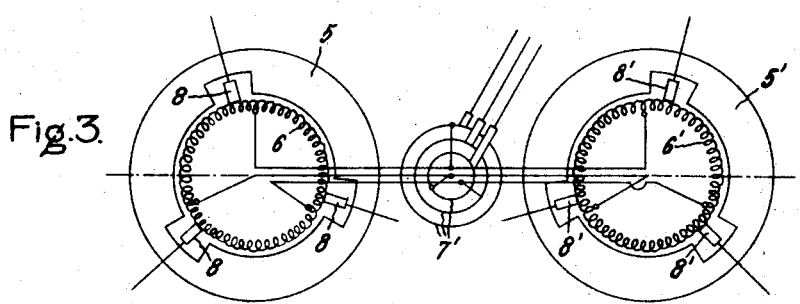
Figure 4:
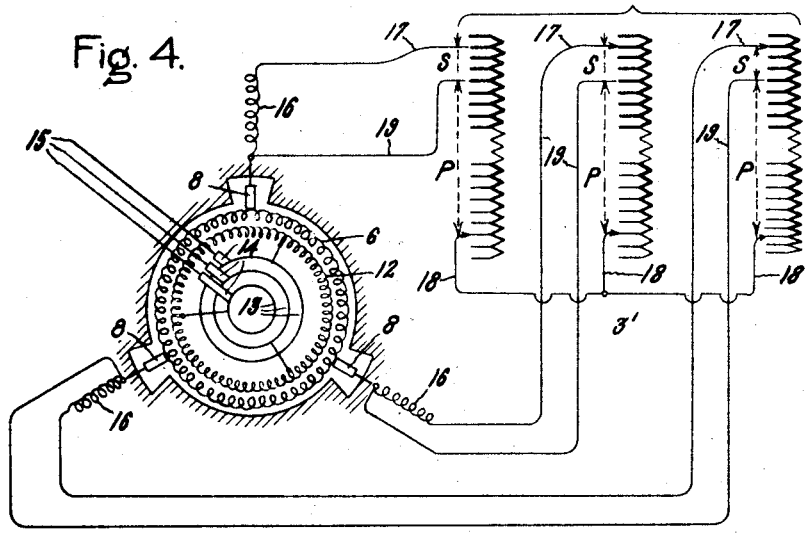
Figure 5:
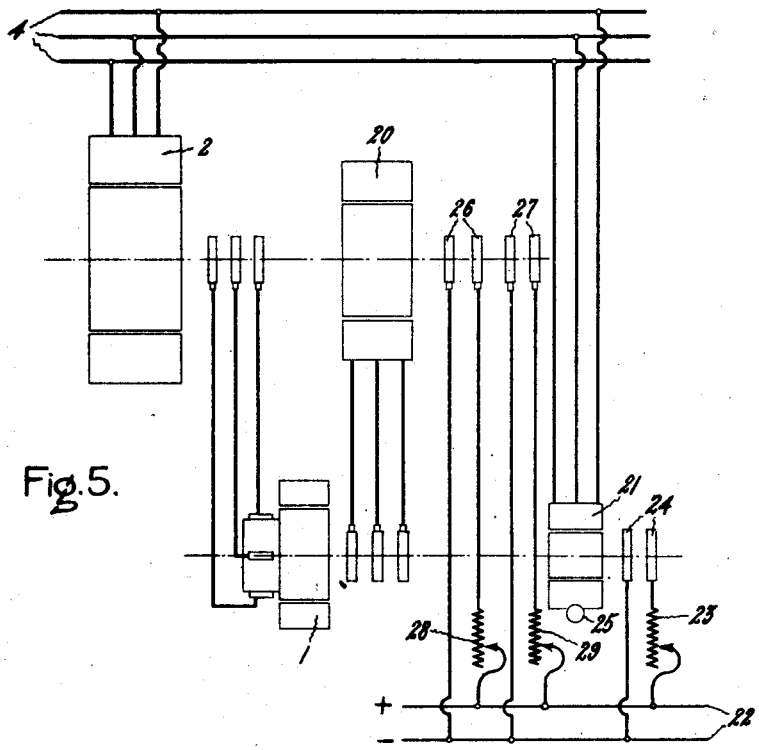

Referring to the drawings, Figs. 1 and 5 show speed control arrangements in which my invention may be embodied; Figs. 2 and 3 show various details of a regulating machine constructed in accordance with my invention; and Fig. 4 shows an arrangement wherein the regulating element and the motor are embodied in a single structure.

Fig. 1 shows a speed control aggregate or system wherein a regulating machine 1 is provided with a commutator, the brushes 8 of which are interconnected with the secondary circuit of an induction motor 2 and the slip rings 7 of which are connected through a transformer 3 to a polyphase line 4 from which current is supplied to the primary circuit of the motor 2.

Assuming the motor 2 and regulating machine 1 to have the same number of poles and to be operated at the same speed, the transformer 3 may be adjusted in a well known manner to vary the voltage applied to the secondary circuit of the motor by the frequency changer or regulating machine 1. As indicated above, the upper limit of the regulating voltage is rather low unless special means are provided for improving the commutation of the regulating winding or machine. Thus, assuming the rotor winding of the regulating machine to be a multiple winding with one turn per commutator bar, the voltage per bar hereinafter designated as $e$, is equal to $$\pi\sqrt{2}f\phi 10^{-8} = \pi\sqrt{2}(f_1+f_2)\phi 10^{-8},$$

where $f$ = the frequency of the polyphase line 4, $f_1$ = the speed of the motor, $f_2$ = the slip frequency of the motor, and $\phi$ = the flux embraced by a turn of the regulating machine rotor winding. It will be readily understood that this voltage is dependent both on the speed at which the winding or machine is rotated and on the rotational speed of the field flux. The voltage per commutator bar may therefore be divided into a component $$e_1 = \pi\sqrt{2}f_1\phi 10^{-8}$$

representing the part of the total voltage $e$ produced by rotation of the regulating winding or machine and a component $$e_2 = \pi\sqrt{2}f_2\phi 10^{-8}$$

due to rotation of the field flux.

If no means are provided for limiting the field flux in the commutating zone of the regulating machine or winding, the total voltage $e$, which is equal to $e_1+e_2$, is necessarily limited to a value at which good commutation is realized. It is possible, however, to suppress the field in the commutating zone by slotting the stator field structure at points adjacent the commutated conductors of the regulating winding or machine. In this manner, the component voltage $e_1$ in the commutating zone may be suppressed and both the flux $\phi$ and the voltage $e$ may be increased in proportion to the quotient obtained by dividing $f_2$ into $f$. Thus assuming a speed regulation of plus and minus 30% and current to be supplied to the motor at 50 cycles, it is possible to raise the voltage at the commutator of the regulating machine from 45 volts to $(100 \times 45) \div 30 = 150$ volts and to reduce the size of the commutator and the number of commutator brushes accordingly.

Fig. 2 shows certain details of a frequency changer or regulating machine wherein a stator member 5 is slotted at points adjacent the commutating zones of a rotor winding 6 connected to slip rings 7 and to commutator brushes 8. As indicated by Fig. 1, the brushes 8 may be connected to the secondary circuit of the motor 1 and the slip rings 7 may be connected to the line 4 through the transformer 3. Damper windings may be placed in the slots of stator member 5 in order more effectively to suppress the flux in the zone of commutation. While the winding 6 is diagrammatically shown in Fig. 2 as a ring winding, it will be evident that this winding usually will be of the drum type and that, in the case of three phase machines, it may be wound with a pitch of 120 electrical degrees. In order to minimize deformation of the regulating machine field by the slots in the rotor structure, it is desirable that these slots be made as small as is consistent with good commutation. Inductance coils 11 may be connected between the slip rings 7 and the transformer 3 to minimize the effect of harmonics resulting from deformation of the field.

Fig. 3 shows a regulating element comprising two frequency changers coupled to the same shaft and connected to have current transmitted between their rotor windings 6 and 6′ and the line 4 through a single set of slip rings 7′. In utilizing the regulating element of Fig. 3 to control the secondary voltage of the motor 2, it is necessary that the secondary windings be independent of one another or, in other words, to provide the motor with six slip rings, as shown for example in Fig. 1 of British Patent 16,559 of 1909, each connected to a different terminal of the three phase secondary winding.

Assuming the brushes 8 and 8′ to be in corresponding positions on the windings 6 and 6′ respectively, and the corresponding brushes of the two machines to be connected to opposite ends of the same secondary windings, the regulating voltage may be varied by shifting the stator 5 and brushes 8 in one direction while shifting the stator 5′ and brushes 8′ in the opposite direction and through an angle equal to that through which the brushes 8 and the stator 5 are shifted. The power factor of the motor 2 may be controlled by shifting the stators and brushes of the two machines in opposite directions through unequal angles.

Fig. 4 shows a speed control system wherein the regulating element and the motor are comprised in a single integral structure, the regulating winding 6 being mounted on the rotor member together with the motor primary winding 12 which may be connected to the line 4 through slip rings 13, brushes 14 and leads 15, and the secondary windings 16 of the motor being interconnected with a regulating transformer 3′ provided with adjustable taps 17 and 18 and with fixed taps 19. With these connections, the voltage of the winding 6 is impressed on the primary turns P of the transformer 3′ and the secondary voltage of this transformer is impressed on the secondary windings 16 of the motor through the secondary turns S of the transformer.

Assuming the transformation ratio of the rotor windings to be unity, the speed of the motor is approximately equal to $$V = \frac{60f}{p} \frac{P \pm S}{P}$$

where $2p$ is the number of poles. When the adjustable taps 17 coincide with the stationary taps 19, S is zero, the motor secondary windings 16 are short circuited, and the machine works as an ordinary induction motor. By moving the taps 17 from the taps 19 in one direction or the other, the speed of the motor may be varied between certain hypersynchronous and hyposynchronous values.

The pressure between the brushes 8, in the arrangement of Fig. 4 is dependent on the voltage applied to the slip rings 13 and is independent of the motor speed. As the speed of the motor changes, however, the frequency of the current transmitted between the winding 6 and transformer 3′ changes in a manner to vary the flux of the transformer, and it is desirable that the taps 18 be adjusted in a manner to render the transformer flux substantially independent of frequency. At synchronous speed of the machine, direct current is transmitted between the winding 6 and the transformer 3′. In order to limit this current to safe values, the sectional area of the primary winding may be gradually increased as indicated in the figure or other means of limiting the regulating current in the neighborhood of synchronism may be provided. It will be apparent that the autotransformer 3′ may be replaced by a transformer having conductively independent primary and secondary windings in installations where the operation of the motor is not carried through synchronism and that the windings 6 and 12 of the motor may be replaced by a single winding.

Fig. 5 shows a speed control system wherein the regulating machine 1 is arranged to be supplied with current from an alternator 20 mounted on the motor shaft and to be driven by a synchronous machine 21 which is supplied with alternating current from the polyphase line 4, is supplied with direct current excitation through line 22, adjustable resistor 23 and slip rings 24, and is provided with a worm screw 25 for making angular adjustments in the position of its stator member. The alternator 20 may be provided with angularly displaced field windings, as shown for example in United States Patent 1,529,341, having their terminals connected to the slip rings 26 and 27 respectively, the slip rings 26 and 27 being interconnected with the line 22 through resistors 28 and 29 respectively which may be adjusted independently to control the angular position of the alternator field and the phase of the voltage impressed on the motor 2 by the machine 1. The phase of this voltage may be controlled also by shifting the brushes of the regulating machine 1 or by angular adjustments in the stator of the machine 21. The resistors 28 and 29 are simultaneously adjusted to vary the voltage of machines 1 and 20 for the purpose of controlling the motor speed.

The embodiments of the invention illustrated and described herein have been selected for the purpose of clearly setting forth the principles involved. It will be apparent, however, that the invention is susceptible of being modified in many ways, to meet the different conditions encountered in its use and I therefore aim to cover by the appended claims all modifications within the true spirit and scope of my invention.

What I claim as new and desire to secure by Letters Patent of the United States, is

1. An induction motor speed control system comprising a wound secondary induction motor, a variable frequency source of excitation for the secondary of said motor, a transformer connected between said source and the secondary of said motor, means for adjusting the transformation ratio of said transformer for varying the voltage impressed upon the secondary of said motor, and means for varying the impedance of the primary circuit of said transformer independently of said first mentioned adjustment.

2. An induction motor speed control system comprising an induction motor having a secondary winding, a rotor core member provided with a commutated winding for applying a regulating voltage to the secondary circuit of said motor, a stator core member provided with slots arranged to limit the flux in the commutating zone of said winding, and a transformer arranged to have its transformation ratio adjusted for controlling the magnitude of said regulating voltage and to have the number of its primary turns adjusted independently of said first mentioned adjustment for preventing change in the transformer flux due to variation in the frequency of the current transmitted therethrough.

3. An induction motor speed control system comprising an induction motor having a secondary winding, a rotor core member provided with a commutated winding for applying a regulating voltage to the secondary circuit of said motor, a stator core member provided with slots arranged to limit the flux in the commutating zone of said winding, and a transformer arranged to have its transformation ratio adjusted for controlling the magnitude of said regulating voltage and to have the impedance of its primary circuit adjusted independently of said first mentioned adjustment for rendering the transformer flux independent of variations in the frequency of said regulating voltage.

In witness whereof I have hereunto set my hand this 17th day of March, 1925.

HIDDE K. SCHRAGE.